(12) United States Patent
Lazar

(10) Patent No.: US 6,208,933 B1
(45) Date of Patent: *Mar. 27, 2001

(54) CARTOGRAPHIC OVERLAY ON SENSOR VIDEO

(75) Inventor: Jonathan Noel Lazar, Huntington Beach, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,889

(22) Filed: Dec. 4, 1998

(51) Int. Cl.⁷ ........................................... G01G 7/78
(52) U.S. Cl. ................. 701/207; 701/208; 701/214; 345/113; 345/118; 342/63; 342/64; 342/357.01; 342/357.08
(58) Field of Search ................. 701/200, 206, 701/207, 208, 211, 214, 300; 342/64, 63, 357.01, 357.08, 46, 53; 345/113, 118, 121, 7, 8; 340/988, 995

(56) References Cited

U.S. PATENT DOCUMENTS

| | | |
|---|---|---|
| 4,086,632 * | 4/1978 | Lions .................... 701/210 |
| 4,360,876 | 11/1982 | Girault et al. ............ 364/449 |
| 4,849,827 | 7/1989 | Hashimoto et al. ........ 358/342 |
| 4,873,513 | 10/1989 | Soults et al. ............ 340/723 |
| 4,876,651 | 10/1989 | Dawson et al. ............ 364/449 |
| 4,964,723 | 10/1990 | Murgue et al. ............ 356/141 |
| 5,359,526 | 10/1994 | Whittington et al. ...... 364/443 |
| 5,519,392 | 5/1996 | Oder et al. .............. 340/995 |
| 5,557,397 | 9/1996 | Hyde et al. .............. 356/5.01 |
| 5,566,073 * | 10/1996 | Margolin ................. 701/213 |
| 5,596,500 | 1/1997 | Sprague et al. .......... 364/449.7 |
| 5,721,679 | 2/1998 | Monson .................. 364/424.07 |

* cited by examiner

*Primary Examiner*—William A. Cuchlinski, Jr.
*Assistant Examiner*—Yonel Beaulieu
(74) *Attorney, Agent, or Firm*—Terry J. Anderson; Karl J. Hoch, Jr.

(57) ABSTRACT

A sensor system for providing a cartographic overlay on a displayed sensor image for a current location within a selected region. The sensor system includes a sensor for generating the sensor image and a location device for generating a location signal corresponding to the current location of the sensor. Additionally, the system includes a storage device in electrical communication with the location device wherein the storage device electronically stores cartographic data for the selected region. The cartographic data consist of titles and symbols for known objects in the region. The storage device is operative to generate a map data signal corresponding to the cartographic data based on the location signal. The system further includes a display in electrical communication with the sensor and the storage device for presenting a final image. The display produces a final image that consists of the sensor image superimposed with cartographic data based upon the map data signal.

13 Claims, 2 Drawing Sheets

CARTOGRAPHIC OVERLAY ON SENSOR VIDEO

FIELD OF THE INVENTION

The present invention relates generally to sensor images and more specifically to a system that overlays data upon the sensor image to aid in the identification of objects.

BACKGROUND OF THE INVENTION

Currently, information about a surrounding area and/or terrain is available by looking at a map. If a pilot or navigator of an aircraft needs to know the identity of a road, building or landmark outside the aircraft, they need to determine the location of the object and then consult a map to find the identity of the object. This can be a distraction for the aircrew because they must alternate between looking outside the aircraft for objects and then refocus their attention back inside the aircraft to consult a map to determine the identity of the object.

Many aircraft, military aircraft in particular, use sensors for targeting and navigation. These sensors, which may be infra-red, night-vision, video or radar, can detect objects and landmarks outside the aircraft and display them on a sensor display (e.g., a video screen) for the aircrew to view. Many times, such as in bad weather or at night, these sensors can provide a superior image of the surrounding terrain than possible from looking through the window of the aircraft. However, the aircrew must still spend time trying to identify the objects presented on the sensor image by using a map since the image presented on the display does not show the identity of objects that are being viewed. As such, the aircrew must still consult a map in order to determine the identity of the object presented on the sensor image. Furthermore, it may not be easy to identify objects on the sensor image because of the type of sensor used. For example, it may not be possible to find objects on an image produced by radar because of the clutter and poor resolution produced in the resulting image.

The present invention addresses the deficiencies in prior art sensor images by providing a system that superimposes identifying map data upon objects in the sensor image. As such, it is easier for the aircrew to concentrate on the task at hand since they do not need to determine the identity of objects by looking at a separate map. Furthermore, the present invention may provide such map data superimposed upon a heads-up display or visor helmet of a viewer for a quick and easy display of information.

SUMMARY OF THE INVENTION

In accordance with the preferred embodiment of the present invention, there is provided a sensor system for providing a cartographic overlay on a displayed sensor image for a current location within a selected region. The system comprises a sensor for generating the sensor image and a location device for generating a location signal corresponding to the current location of the sensor within the selected region. Furthermore, the system includes a storage device which includes electronically stored cartographic data for the selected region. The storage device is in electrical communication with the location device, and is operative to generate a map data signal corresponding to the cartographic data based on the location signal. Additionally, the system further includes a display in electrical communication with the storage device and operative to display a final image. The final image comprises the sensor image superimposed with the cartographic data based upon the map data signal for the current location of the selected region.

In the preferred embodiment of the present invention, the sensor may be movable such that it will have a pan, tilt, and rotation. In this respect, the location device is configured such that the location signal is based on a known coordinate system as refined by the pan, tilt, rotation and field of view of the sensor and the platform position and attitude. Additionally, the sensor image may include displayed objects for the current location within the selected region and the corresponding cartographic data for the final image includes titles and symbols representative of respective ones of the objects. Furthermore, the sensor may be a low light sensor, an infra-red sensor or a video sensor while the display may be a head-up display, a helmet visor or a sensor monitor.

A method for displaying a cartographic overlay on a sensor image comprises generating a sensor image with a sensor. Next, a location signal is generated that corresponds to a current location of the sensor within a selected region. Additionally, a map data signal is generated corresponding to cartographic data based on the location signal. Finally, a final image is displayed wherein the final image comprises the sensor image superimposed with cartographic data based upon the map data signal for the current location.

BRIEF DESCRIPTION OF THE DRAWINGS

These as well as other features of the present invention, will become more apparent upon reference to the drawings wherein.

DETAILED DESCRIPTION OF THE PREFERRED EMBODIMENTS

Figure 1:
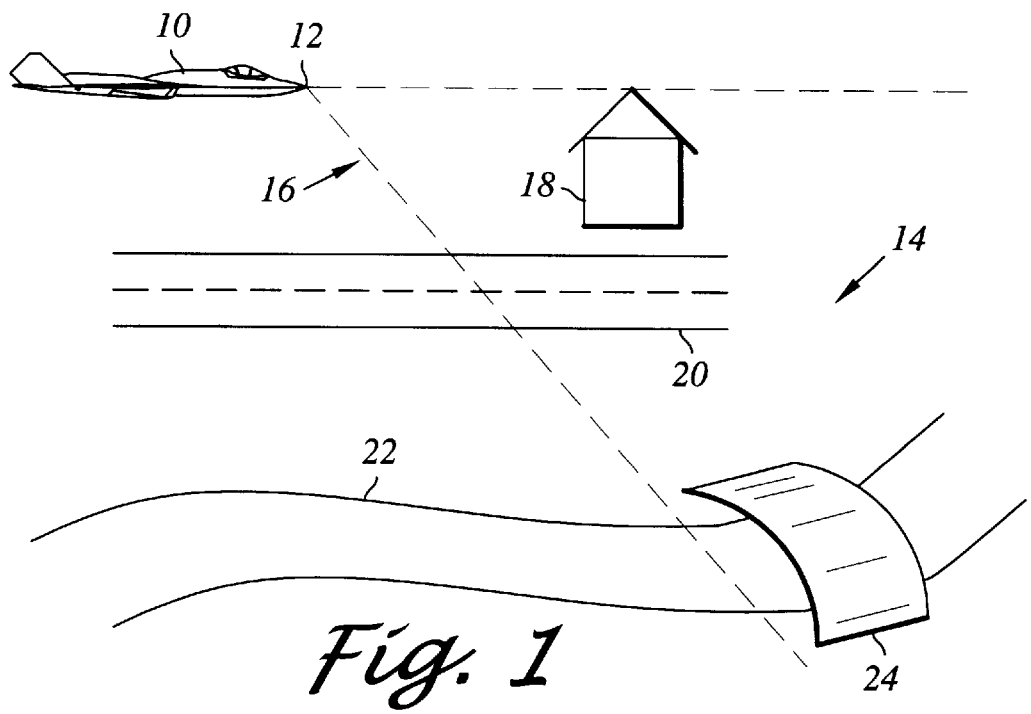
FIG. 1 is a perspective view of a platform, such as an aircraft, with a sensor attached thereon and used in accordance with the preferred embodiment of the present invention.

Referring now to the drawings wherein the showings are for purposes of illustrating a preferred embodiment of the present invention only, and not for purposes of limiting the same, FIG. 1 is a perspective view of a platform 10 such as an aircraft with a sensor 12 attached thereon for viewing a landscape 14. It is not necessary for sensor 12 to be mounted only on a platform 10 that is an aircraft, but it is also possible to mount sensor 12 on any type of vehicle or alternatively sensor 12 may be mounted in a hand-held portable unit. The sensor 12 can be any type of sensor such as radar, video, infra-red, imaging radar, imaging laser or low-light sensor to produce an image of landscape 14 better than can be seen with the naked eye such as during bad weather or nighttime. As shown by way of example only, sensor 12 is movable and has a pan, tilt and optional rotation such that sensor 12 has horizontal and vertical visible angles or field of view 16 that encompass multiple objects such as a building 18, a highway 20, a river 22 and a bridge 24.

Figure 2:
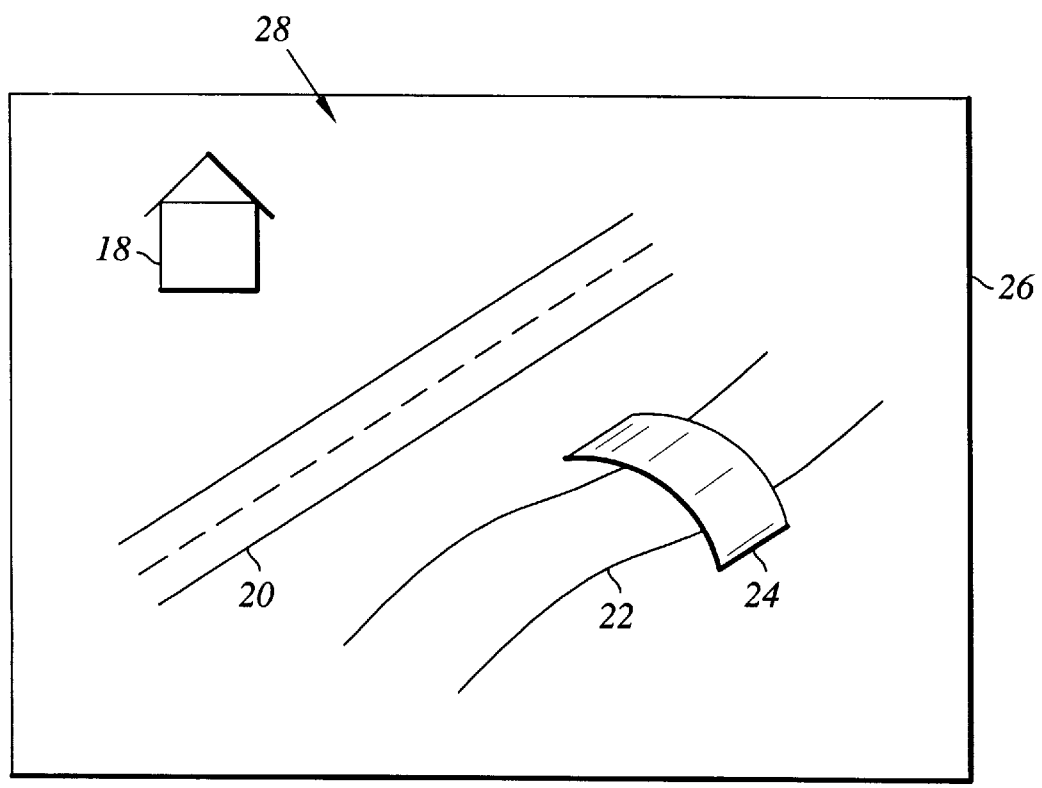
FIG. 2 is a sensor image from the sensor in FIG. 1.

In accordance with the preferred embodiment of the present invention, as shown in FIG. 2, a sensor display 26 presents an image 28 from sensor 12. The display 26 may be a video monitor, a clear heads-up display, a helmet mounted display (e.g., clear visor) or any other type of sensor display capable of presenting image 28 produced by sensor 12. As such, display 26 will present image 28 produced by sensor 12, but depending on the type of sensor 12, the image 28 may not be in a form easily recognizable for the viewer. For example, if image 28 is from a sensor 12 that is a radar transmitter/receiver, it is possible that image 28 will not present the detail necessary for the aircrew to discern identifiable objects due to clutter.

Figure 3:
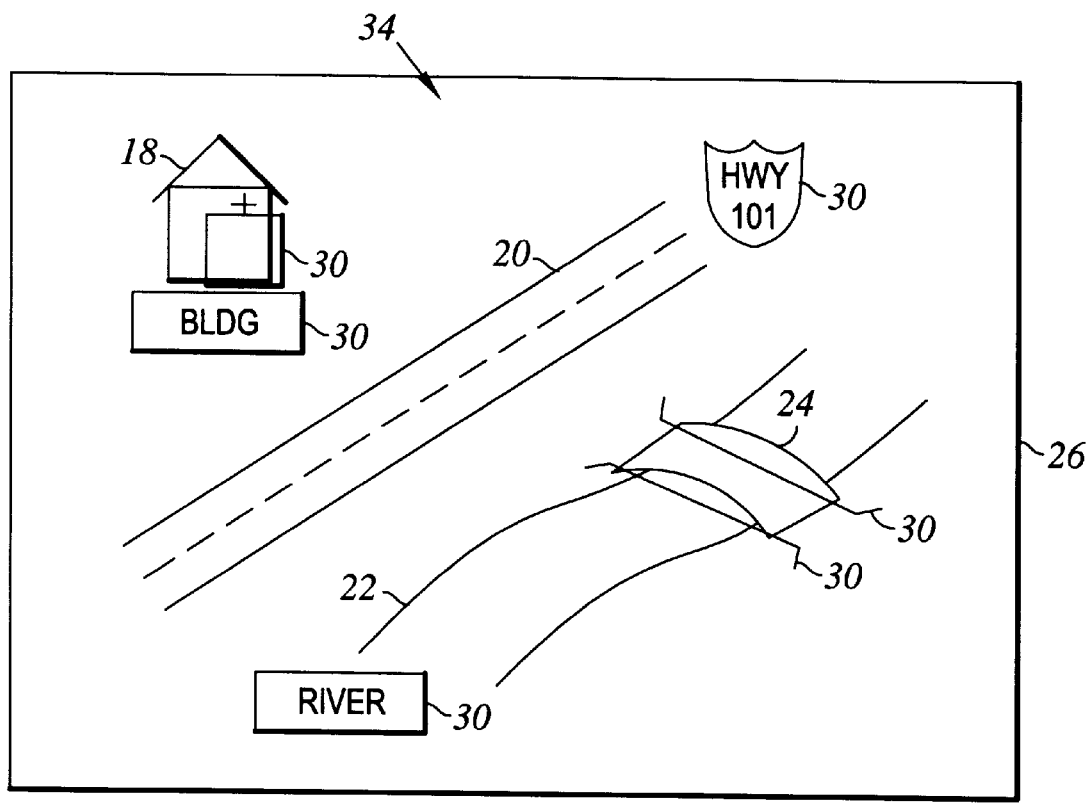
FIG. 3 is the sensor image of FIG. 2 with an overlay of cartographic data superimposed thereover.

Therefore, in accordance with the present invention, as seen in FIG. 3, an overlay of data 30 is superimposed onto image 28 in order to aid in the identification of objects. The sensor image 28 has been superimposed with data 30 near the objects that have been detected by sensor 12 thereby creating a composite or final image 34 for presentation on display 26. As such, it is easier to identify building 18 with data 30 containing the information "BLDG" and symbol superimposed thereon. Similarly, data 30 containing information about highway 20 (HWY 101 Symbol), river 22 ("RIVER"), and bridge 24 (Bridge Symbol) can be superimposed on or near their respective objects. The data 30 containing information about the objects may be a title as seen with river 22, or it may be a symbol representing an object as shown by the bridge symbol superimposed on bridge 24 or the highway symbol "HWY 101" near the highway 20. Therefore, it is possible to present cartographic data 30 in the form of symbols and titles onto sensor image 28 in order for a viewer to easily interpret sensor image 28 without taking his eyes off display 26.

Figure 4:
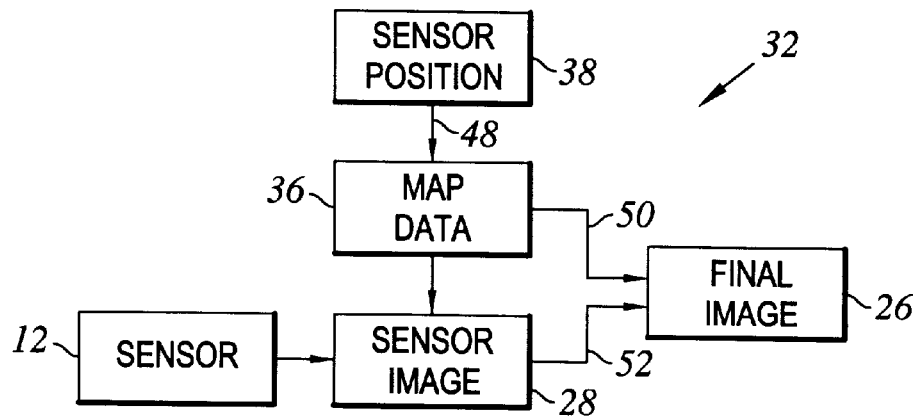
FIG. 4 is a block level diagram of the preferred embodiment of the present invention.

Therefore, in order to create a composite or final image 34, as shown in FIG. 3, a sensor system 32 superimposes cartographic data 30 onto the sensor image 28. In this respect, FIG. 4 is a schematic representation of how system 32 creates a final image 34 by combining cartographic data 30 with sensor image 28. System 32 comprises a sensor 12, as previously described, that generates a sensor image 28 of landscape 14 and a resultant sensor image signal 52. Additionally, the current position of sensor 12 within a selected region is determined from an electronic location device 38. As will be recognized by those skilled in the art, the location device 38 may use the platform location/position, platform attitude, and sensor attitude to determine the sensor's 12 field of view 16 and location. Specifically, the location device 38 can accurately determine the location and field of view 16 of the sensor 12 based upon the platform latitude, longitude and altitude (collectively the platform location/position), platform course, pitch, and roll (collectively the platform attitude), and the sensor pan, tilt and rotation (collectively the sensor attitude). Additionally, location device 38 may use the sensor's 12 field of view height and width in degrees or radians to determine the field of view 16. As will be recognized, the location device 38 does not need to use all of these components to determine the sensor's 12 field of view 16 but can use any combination that produces an accurate location of the sensor 12 and field of view 16. As such, location device 38 determines the location and field of view 16 of the sensor 12 and accordingly generates an electronic location signal 48 based thereon.

In electrical communication with the location device 38 is a storage device 36 which includes electronically stored cartographic data (or map data) 30 for the selected region. The cartographic data 30 stored therein contains the location for the objects in the region selected. Additional information about the objects such as titles and symbols representative of respective objects is also included in cartographic data 30. For proper operation of the system 32, the storage device 36 will additionally contain electronic circuitry operative to select the cartographic data 30 for the location and field of view 16 of sensor 12 based upon the location signal 48 for the current position. Therefore, storage device 36 will generate a map data signal 50 corresponding to the cartographic data 30 for the location and field of view 16 of the sensor 12 (i.e., based on the location signal 48) such that the cartographic data 30 selected will contain titles and symbols representative of the objects in sensor image 28.

In order to create a composite or final image 34, the display 26 combines the sensor image signal 52 with the map data signal 50. The display 26 is in electrical communication with the sensor 12 and storage device 36 and contains electronic circuitry to combine sensor image signal 52 with the map data signal 50 corresponding to the present location and field of view 16 of sensor 12. As will be recognized, cartographic data 30 is superimposed over image 28 by display 26 with conventional video and image processing techniques as known by those skilled in the art. Therefore, the final image 34 will comprise the sensor image 28 with the cartographic data 30 superimposed on or near the objects as seen in FIG. 3.

The location of cartographic data 30 on display 26 is determined from the location of objects as found in cartographic data 30. Therefore, data 30 is positioned on display 26 corresponding to the known location of the respective object. Therefore, it is possible to position data 30 on display 26 such that the position of the data 30 is overlaid on the respective object in order to aid in identification of objects.

It is also contemplated that display 26 can be a clear heads-up display whereby the system 32 positions the cartographic data 30 on a clear display such that the aircrew can view the object through the clear display and also see the data 30 superimposed near the object on the clear display. Ideally, when using a clear display, the position of the user's head is determined with sensors so that the field of view of the user can be determined. Therefore, when the field of view of the viewer is known, it is possible to determine what objects the viewer can see through the clear display in order to determine the position of data 30 superimposed thereon. Alternatively, the display may be a clear visor of a helmet or the windshield of an aircraft whereby the data 30 is projected thereon for aiding in the identification of objects as seen through the display.

It will be recognized that the system 32 will produce a final image 34 with cartographic data 30 superimposed thereon when the system 32 is located in a region where the storage device 36 contains such data 30. As such the image produced by system 32 will not include data 30 superimposed in regions where cartographic data 30 is not available. Therefore, in regions outside the coverage area of cartographic data 30, the final image will comprise just the sensor image 28.

Additional modifications and improvements of the present invention may also be present to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A sensor system for providing a cartographic overlay on a displayed sensor image of a current location within a selected region, the sensor system comprising:

a sensor attached to a moving platform for generating the sensor image, the sensor image being representative of detected objects proximate the current location of the platform;

a location device for generating a location signal corresponding to the current location of the sensor within the selected region;

a storage device including electronically stored cartographic data for the selected region, the storage device being in electrical communication with the location device and operative to generate a map data signal corresponding to the stored cartographic data based on the location signal; and a display in electrical communication with the sensor and the storage device, the display being operative to present a composite image comprising the sensor image and the map data such that the sensor image is superimposed upon and relocatable in relation to an underlying map data.

2. The sensor system of claim 1 wherein:

the sensor is movable and has a pan, a tilt, a rotation and a visible angle; and the location device is configured such that the location signal is based on a known coordinate system as refined by the pan, the tilt, the rotation and the visible angle of the sensor.

3. The sensor system of claim 2 further comprising:

a platform having a position and an attitude and attached to the sensor;

wherein the location device is configured such that the location signal is further refined by the position and attitude of the platform.

4. The sensor system of claim 1 wherein:

the cartographic data of the final image includes titles and symbols representative of respective ones of the objects detected by the sensor.

5. The sensor system of claim 1 wherein the sensor is selected from the group consisting of:

a low light sensor;

an infra-red sensor;

a video sensor;

a radar imaging sensor; and a laser imaging sensor.

6. The sensor system of claim 1 wherein the display is selected from the group consisting of:

a heads-up display;

a helmet visor; and a sensor monitor.

7. A method for displaying a cartographic overlay on a displayed sensor image, the method comprising the steps of:

a) generating the sensor image with a sensor mounted on a moving platform, the sensor image being representative of detected objects proximate the current location of the platform;

b) generating a location signal corresponding to a current location of the sensor within a selected region;

c) generating a map data signal corresponding to stored cartographic data based on the location signal; and d) displaying a composite image comprising the sensor image and the map data such that the sensor image is superimposed upon and relocatable in relation to an underlying map data.

8. The method of claim 7 wherein step (b) comprises generating a location signal corresponding to a sensor pan, a sensor tilt, a sensor rotation, a platform position and a platform attitude within the selected region.

9. The method of claim 7 wherein step (d) comprises displaying the final image on a display selected from the group consisting of:

a heads-up display;

a helmet visor; and a sensor monitor.

10. The sensor system of claim 1 wherein the platform is an aircraft.

11. The sensor system of claim 1 wherein a dynamic sensor image is superimposeable upon static cartographic data.

12. The sensor system of claim 7 wherein the platform is an aircraft.

13. The sensor system of claim 1 wherein a dynamic sensor image is superimposeable upon static cartographic data.

* * * * *